H. E. WOODIN.
SECTIONAL WEED HOOK.
APPLICATION FILED JUNE 19, 1909.
958,055.
Patented May 17, 1910.
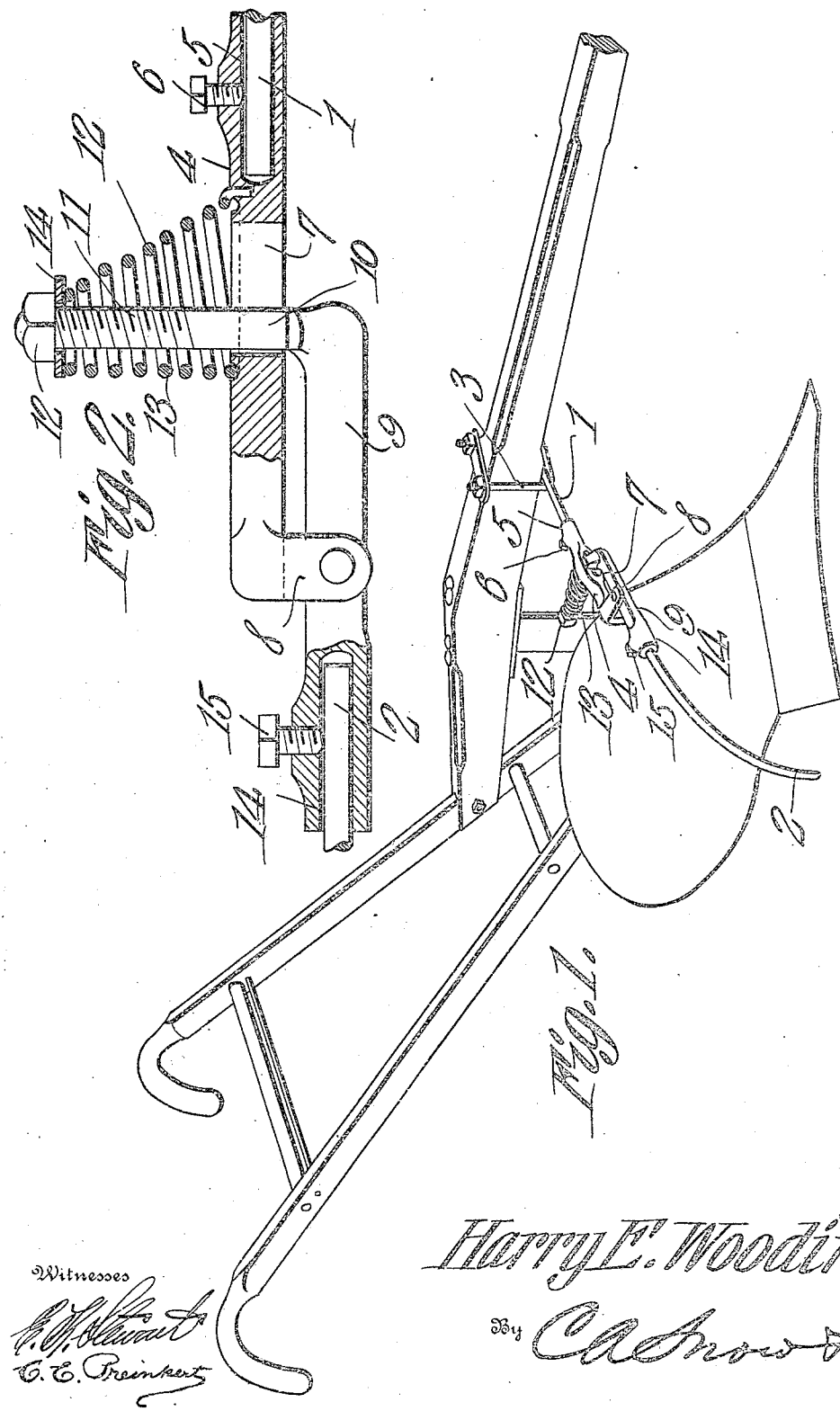

UNITED STATES PATENT OFFICE.

HARRY E. WOODIN, OF LAURENS, IOWA.

SECTIONAL WEED-HOOK.

958,055.  Specification of Letters Patent.  Patented May 17, 1910.

Application filed June 19, 1909.  Serial No. 503,204.

*To all whom it may concern:*

Be it known that I, HARRY E. WOODIN, a citizen of the United States, residing at Laurens, in the county of Pocahontas and State of Iowa, have invented a new and useful Sectional Weed-Hook, of which the following is a specification.

This invention has relation to sectional weed hooks especially adapted to be attached to breaking plows for the purpose of turning the vegetable growth under the furrow as it is cast up, and it consists in the novel construction and arrangement of its parts, as hereinafter shown and described.

The object of the invention is to provide a hook of the character indicated which is made up of a series of sections connected together by a spring hinge mechanism whereby the outer section of the hook is at liberty to swing away from an extra large obstruction should such an obstruction be cast up by the mold-board of the plow to which the hook is applied.

In the accompanying drawings:—Figure 1 is a perspective view of a plow with the sectional weed hook applied thereto. Fig. 2 is a side elevation, with parts in section of the hinge mechanism of the weed hook.

The weed hook proper consists of an inner section 1 and an outer section 2. The section 1 in practice is secured to the beam of a plow by means of an appropriate clamp 3, as illustrated in Fig. 1 of the drawings.

The hinge mechanism for connecting the inner and outer hook sections 2 together consists of a member 4, which is provided at its inner end with a socket 5, adapted to receive the outer end of the hook section 1. When inserted in the said socket 5 the end of the hook section 1 is secured therein by means of a set screw 6 which passes transversely through one of the walls of the said socket 5. The member 4 is provided with an elongated slot 7, which is located at a point intermediate of the ends of the said member. At that end of the member 4 opposite the end thereof at which the socket 5 is located is formed a pair of laterally disposed lugs 8. A member 9 is pivoted between the lugs 8 and is provided at its inner end with a laterally disposed shank 10, which passes through the slot 7 in the member 4 and projects beyond the same and is provided with a threaded extremity 11. A nut 12 engages the thread of the extremity 11, and a coil spring 13 is interposed between the under face of the nut and the adjacent face of the member 4. If desired, a washer 14 may be interposed between the under face of the nut 12 and the adjacent end of the coil spring 13 in the manner as illustrated in Fig. 2 of the drawings. By this arrangement it will be seen that means is provided for adjusting or regulating the tension of the spring 13, for, by screwing the nut 12 upon the threaded extremity 11 of the shank 10, the said nut is caused to move longitudinally along the said shank, and thus the compression of the spring 13 is increased or diminished, as occasion may require or fancy dictate. The member 9 is provided at that end opposite the end upon which the shank 10 is located with a socket 14 which receives the inner end of the hook section 2. A set screw 15 passes transversely through one of the walls of the socket 14 and is adapted to engage, at its inner end, the inner end portion of the hook section 2 and hold the same in an adjusted position.

From the above description it is obvious that when the hook is applied to the beam of a plow, as indicated in Fig. 1 of the drawings, and the outer hook section 2 comes in contact with an extra large bunch of vegetable matter or other obstruction, the outer end of the said hook section 2 is free to swing subject to the pent-up tension of the spring 13, away from the said obstruction, and, as soon as the obstruction is passed, the tension of the spring 13 comes into play and swings the outer hook section 2 back into its normal position. Thus it will be seen that the weed hook will not drag or catch into an obstruction and operate as a means for increasing the side draft of the plow to which the hook is applied.

Having described my invention, what I claim as new and desire to secure, by Letters Patent, is:—

A weed hook comprising members hinged together and provided at their outer ends with sockets, a spring engaging both members and resiliently holding them in normal relation and a hook section held in the socket of each member and extending in opposite directions.

In testimony that I claim the foregoing as my own, I have hereto affixed my signature in the presence of two witnesses.

HARRY E. WOODIN.

Witnesses:
R. G. CUNDY,
BIRT BOURRET.